(12) United States Patent
Wyse

(10) Patent No.: US 10,516,426 B1
(45) Date of Patent: Dec. 24, 2019

(54) SYSTEMS AND METHODS FOR WIDEBAND IMAGE-REJECTING RECEIVERS

(71) Applicant: Rockwell Collins, Inc., Cedar Rapids, IA (US)

(72) Inventor: Russell D. Wyse, Center Point, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 16/142,130

(22) Filed: Sep. 26, 2018

(51) Int. Cl.
*H04B 1/10* (2006.01)

(52) U.S. Cl.
CPC ... *H04B 1/1036* (2013.01); *H04B 2001/1063* (2013.01)

(58) Field of Classification Search
CPC .............. H04B 1/1036; H04B 2001/1063
USPC ............................................ 375/350
See application file for complete search history.

(56) References Cited

U.S. PATENT DOCUMENTS

| | | | | |
|---|---|---|---|---|
| 5,570,350 A * | 10/1996 | Myer | ................... | H04B 1/1036 370/335 |
| 5,612,975 A * | 3/1997 | Becker | ................. | H04L 7/0029 329/308 |
| 5,789,996 A * | 8/1998 | Borodulin | ................ | H01P 5/12 333/117 |
| 8,497,730 B1 * | 7/2013 | Wyse | .................... | H03H 11/48 326/30 |
| 8,660,514 B1 * | 2/2014 | Wyse | .................... | H03F 1/3211 327/356 |
| 8,963,612 B1 | 2/2015 | Wyse et al. | | |
| 9,059,662 B1 | 6/2015 | Wyse et al. | | |
| 9,240,815 B1 | 1/2016 | Wyse | | |
| 9,432,126 B1 * | 8/2016 | Wyse | .................. | H04B 10/693 |
| 9,673,877 B1 | 6/2017 | Wyse et al. | | |
| 2008/0164939 A1 * | 7/2008 | Lin | ...................... | H03H 7/0153 327/554 |
| 2010/0233984 A1 * | 9/2010 | Yang | .................... | H04B 1/1036 455/307 |

* cited by examiner

*Primary Examiner* — Juan A Torres
(74) *Attorney, Agent, or Firm* — Donna P. Suchy; Daniel M. Barbieri

(57) ABSTRACT

A wideband receiver includes an active splitter that splits an electronic signal into first and second signals, first and second reconfigurable RF filters, and first and second reconfigurable IF filters. The first reconfigurable RF filter filters the first signal responsive to a first control signal and mixes the first filtered signal and an in-phase LO signal component to output a first IF signal. The second reconfigurable RF filter filters the second signal responsive to a second control signal to generate a second filtered signal and mixes the second filtered signal and a quadrature phase LO signal component to output a second IF signal. The first reconfigurable IF filter filters the first IF signal responsive to a third control signal to generate a first filtered IF signal. The second reconfigurable IF filter filters the second IF signal responsive to a fourth control signal to generate a second filtered IF signal.

20 Claims, 5 Drawing Sheets

SYSTEMS AND METHODS FOR WIDEBAND IMAGE-REJECTING RECEIVERS

BACKGROUND

The present disclosure relates generally to radio communication hardware. More particularly, the present disclosure relates to systems and methods for wideband image-rejecting receivers.

Radio communication hardware, such as radio frequency (RF) receivers and transmitters, can be used to send and receive electronic signals, including RF signals. It can be useful to have radio communication hardware that can operate at high frequencies and with large bandwidth. However, it can be difficult to enable such performance features while ensuring that the signal provided to digital signal processing components is at an appropriate frequency and also avoiding noise, images, and other undesired effects.

SUMMARY

In one aspect, the inventive concepts disclosed herein are directed to a wideband receiver. The wideband receiver includes an active splitter, a first reconfigurable RF filter circuit, a second reconfigurable RF filter circuit, a first reconfigurable IF filter circuit, and a second reconfigurable IF filter circuit. The active splitter that receives an electronic signal and splits the electronic signal into a first signal on a first path and a second signal on a second path. The first reconfigurable RF filter circuit receives the first signal, filters the first signal responsive to a first control signal to generate a first filtered signal, receives an in-phase component of a local oscillator (LO) signal, and mixes the first filtered signal and the in-phase component of the LO signal to output a first intermediate frequency (IF) signal. The second reconfigurable RF filter circuit receives the second signal, filters the second signal responsive to a second control signal to generate a second filtered signal, receives a quadrature phase component of the LO signal, and mixes the second filtered signal and the quadrature phase component of the LO signal to output a second IF signal. The first reconfigurable IF filter circuit receives the first IF signal and filters the first IF signal responsive to a third control signal to generate a first filtered IF signal. The second reconfigurable IF filter circuit receives the second IF signal and filters the second IF signal responsive to a fourth control signal to generate a second filtered IF signal.

In a further aspect, the inventive concepts disclosed herein are directed to a wideband receiver. The wideband receiver includes an active splitter, a first reconfigurable IF filter circuit, and a second reconfigurable IF filter circuit. The an active splitter is configured to receive an electronic signal, split the electronic signal into a first signal on a first path and a second signal on a second path, and in a first mode of operation, receive an in-phase component of a local oscillator (LO) signal, mix the first signal and the in-phase component of the LO signal to output a first IF signal, receive a quadrature component of the LO signal, and mix the second signal and the quadrature component of the LO signal to output a second IF signal. The first reconfigurable IF filter circuit receives the first signal and filters the first signal responsive to a first control signal to generate a first filtered signal. The second reconfigurable IF filter circuit receives the second signal and filters the second signal responsive to a second control signal to generate a second filtered signal.

In a further aspect, the inventive concepts disclosed herein are directed to a method. The method includes receiving, by an active splitter with independent amplitude and linearity control on each output to align amplitude balance on each output, an electronic signal; splitting, by active splitter, the electronic signal into a first signal on a first path and a second signal on a second path with equal amplitudes; filtering and amplitude alignment, by a first reconfigurable radio frequency (RF) filter circuit, the first signal responsive to a first control signal to generate a first filtered signal; mixing, by a mixer of the first reconfigurable RF filter circuit, the first filtered signal and an in-phase component of a local oscillator (LO) signal to output a first intermediate frequency (IF) signal; filtering and amplitude alignment, by a second reconfigurable RF filter circuit, the second signal responsive to a second control signal to generate a second filtered signal; mixing, by a mixer of the second reconfigurable RF filter circuit, the second filtered signal and a quadrature phase component of the LO signal to output a second IF signal; filtering and amplitude alignment, by a first reconfigurable IF filter circuit, the first IF signal responsive to a third control signal to generate a first filtered IF signal; and filtering and amplitude alignment, by a second reconfigurable IF filter circuit, the second IF signal responsive to a fourth control signal to generate a second filtered IF signal.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
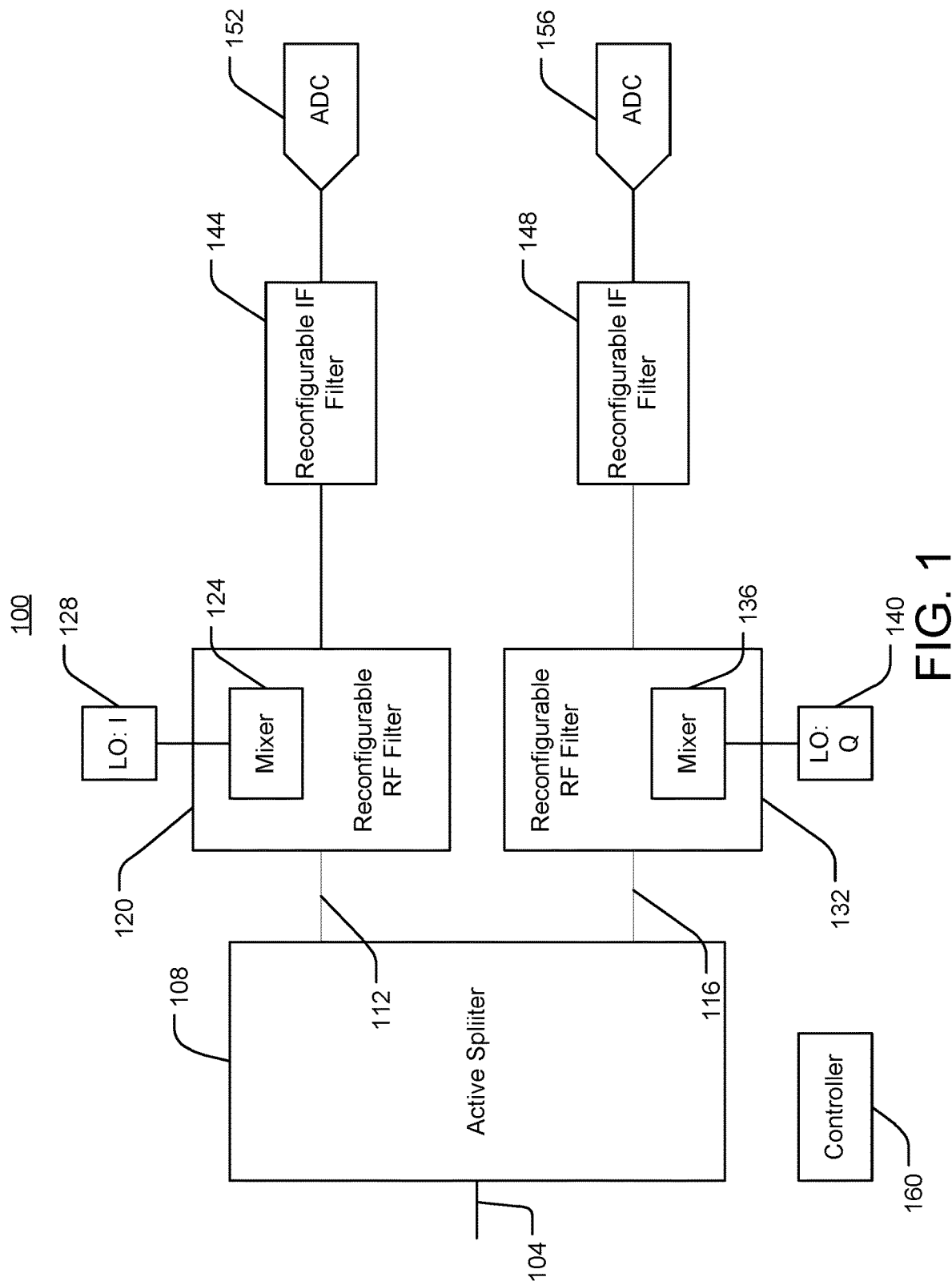
FIG. 1 is a block diagram of an exemplary embodiment of a wideband receiver according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for wideband image-rejecting receivers. The inventive concepts described herein can be utilized in various types of electronic avionics applications for airborne platforms (e.g., fixed wing aircraft, rotary wing aircraft), including but not limited to flight control and autopilot systems, navigation systems, flight display systems, communications systems, phased array control, signal processing, electronically scanned array (ESA) systems, and radar systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a wideband receiver includes an active splitter, a first reconfigurable RF filter circuit, a second reconfigurable RF filter circuit, a first reconfigurable IF filter circuit, and a second reconfigurable IF filter circuit. The active splitter receives an electronic signal and splits the electronic signal into a first signal on a first path and a second signal on a second path. In some embodiments, the active splitter can independently control amplitude and/or linearity of each of the first signal and the second signal. The first reconfigurable RF filter circuit receives the first signal, filters the first signal responsive to a first control signal to generate a first filtered signal, receives an in-phase component of a local oscillator (LO) signal, and mixes the first filtered signal and the in-phase component of the LO signal to output a first intermediate frequency (IF) signal. The second reconfigurable RF filter circuit receives the second signal, filters the second signal responsive to a second control signal to generate a second filtered signal, receives a quadrature phase component of the LO signal, and mixes the second filtered signal and the quadrature phase component of the LO signal to output a second IF signal. The first reconfigurable IF filter circuit receives the first IF signal and filters the first IF signal responsive to a third control signal to generate a first filtered IF signal. The second reconfigurable IF filter circuit receives the second IF signal and filters the second IF signal responsive to a fourth control signal to generate a second filtered IF signal.

The wideband receiver can have improved image rejection over existing systems, including by performing reconfigurable, cascaded filtering in the analog domain. The wideband receiver can enable wideband operation from direct sample (no mixing straight through to ADCs, such as if the received electronic signal is at a sufficiently low frequency to enable digital signal processing) as well as higher frequencies that use mixing (e.g., from approximately 1 GHz to over 50 GHz) while still down-converting to an appropriate intermediate frequency for further digital signal processing. The wideband receiver can be configured in mixing mode to look at both sidebands (when the phase of the LO's are configured to be equal) as well as either sideband independently (when the LO's are configured to be +/−90 degrees from each other), which enables operation in a wideband mode at double a bandwidth of existing systems, and perform a broadband frequency search more quickly than existing systems. The wideband receiver can configure an active splitter to perform independent amplitude and phase control to execute +/−0.05 dB of amplitude alignment and +/−0.5 degrees of phase alignment, enabling approximately 50 dB of image rejection. The system can be integrated with an airborne platform or other platform as described herein. For example, the wideband receivers described herein can be associated with a weather radar system, ESA, or avionics system of an airborne platform.

Referring to FIG. 1, a wideband receiver 100 according to an exemplary embodiment of the inventive concepts disclosed herein includes an active splitter 108, a first reconfigurable RF filter 120, a second reconfigurable RF filter 132, a first reconfigurable IF filter 144, and a second reconfigurable IF filter 148.

The active splitter 108 can receive an electronic signal 104 (e.g., a waveform which may extend across a broad band of frequencies) and split the electronic signal 104 into a first signal on a first path 112 and a second signal on a second path 116. The active splitter 108 can split the electronic signal 104 such that the signals on the paths 112, 116 are substantially equivalent. The active splitter 108 can independently modify at least one of a gain or a phase of each of the first and second signals. The active splitter 108 can incorporate features of the multiple mode circuits described in U.S. Pat. No. 8,660,514, titled "MULTIPLE MODE RF CIRCUIT," which is incorporated herein by reference in its entirety. The active splitter 108 can independently control amplitude and linearity of each of the first signal and the second signal.

The electronic signal 104 can be a radio frequency (RF) signal. For example, the electronic signal 104 can be received from an RF antenna. In some embodiments, frequencies of the electronic signal 104 can range from below 100 MHz to over 100 GHz; as described herein, the reconfigurability of the wideband receiver 100 can enable to wideband receiver 100 to operate over this wide range of frequencies. In some embodiments, a frequency of the electronic signal 104 is at least 5 Gigahertz (GHz). In some embodiments, a frequency of the electronic signal 104 is at least 10 GHz. In some embodiments, a frequency of the electronic signal 104 is 50 GHz. In some embodiments, a frequency of the electronic signal 104 is at most 100 GHz. In some embodiments, the electronic signal 104 has a frequency range from 10 GHz to 50 GHz. It will be appreciated that the various frequencies (and associated cut-offs) described herein may refer to frequencies above or below which a signal strength is less than a suitable threshold.

The first reconfigurable RF filter 120 can receive the first signal on the first path 112 from the active splitter 108 and filter the first signal to provide a first filtered signal to a mixer 124. As described with further reference to FIG. 2 below, the first reconfigurable RF filter 120 can enable cascaded reconfigurability at various filter stages to improve image rejection and instantaneous bandwidth provided by the wideband receiver 100. The first reconfigurable RF filter 120 can execute spectrum shaping. The first reconfigurable RF filter 120 can enable image rejection. The first reconfigurable RF filter 120 can execute band pass filtration and/or create notches, such as in a frequency range where an image may be expected.

As shown in FIG. 1, the first reconfigurable RF filter 120 can include or be coupled to the first mixer 124. The first mixer 124 receives the first filtered signal, and also receives an in-phase (I) component of a local oscillator (LO) signal 128 from an LO (e.g., LO 400 described with reference to FIG. 4). The first mixer 124 can mix the first filtered signal and the signal 128 to generate a first mixed signal, and output a first intermediate frequency (IF) signal based on the first mixed signal. For example, the first mixer 124 can heterodyne the first filtered signal and the signal 128 to generate the first mixed signal. The first IF signal can be at a relatively low frequency as compared to the electronic signal 104, such as a frequency sufficiently low to enable digital signal processing to be executed on the first IF signal with desired performance and/or quality.

The second reconfigurable RF filter 132 can be similar to the first reconfigurable RF filter 120. The second reconfigurable filter 132 can receive the second signal on the second path 116 and filter the second signal to provide a second filtered signal to a second mixer 136. The second reconfigurable RF filter 132 can execute spectrum shaping. The second reconfigurable RF filter 132 can enable image rejection. The second reconfigurable RF filter 132 can execute band pass filtration and/or create notches, such as in a frequency range where an image may be expected. The second reconfigurable RF filter 132 can be independently controlled from the first reconfigurable RF filter 120.

The second mixer 136 can be similar to the first mixer 124. The second mixer 136 receives the second filtered signal, and also receives a quadrature-phase (Q) component of an LO signal 140 from an LO (e.g., LO 400 described with reference to FIG. 4). The signal 140 can be shifted +/−ninety degrees relative to the signal 128, as the LO signal 140 can be the Q component corresponding to the I component of the signal 128. The second mixer 136 can mix the second filtered signal and the signal 140 to generate a second mixed signal, and output a second IF signal based on the second mixed signal. For example, the second mixer 136 can heterodyne the second filtered signal and the signal 140 to generate the second mixed signal. The second mixed signal can be at a relatively low frequency as compared to the electronic signal 104, such as a frequency sufficiently low to enable digital signal processing to be executed on the second IF signal with desired performance and/or quality. The second IF signal can be shifted ninety degrees relative to the first IF signal outputted by the first mixer 124.

The first reconfigurable IF filter 144 receives the first IF signal from the first reconfigurable RF filter 120, and can filter the first IF signal to generate a first filtered IF signal. The first reconfigurable IF filter 144 can be an anti-alias IF filter. The second reconfigurable IF filter 148 receives the second IF signal from the second reconfigurable RF filter 132, and can filter the second IF signal to generate a second filtered IF signal. The second reconfigurable IF filter 148 can be an anti-alias IF filter.

In some embodiments, the first reconfigurable IF filter 144 is coupled to a first analog-to-digital converter (ADC) 152. The first ADC 152 can receive the first filtered IF "I" signal from the first reconfigurable IF filter 144, and output a first digital signal corresponding to the first filtered IF signal. For example, the first ADC 152 can sample the first filtered IF signal to generate the first digital signal.

In some embodiments, the second reconfigurable IF filter 148 is coupled to a second ADC 156, which can be similar to the first ADC 152. The second ADC 156 can receive the second filtered IF "Q" signal from the second reconfigurable IF filter 148, and output a second digital signal corresponding to the second filtered IF signal. For example, the second ADC 156 can sample the second filtered IF signal to generate the second digital signal. In some embodiments, the first and second ADCs 152, 156 output the first and second digital signals to a digital signal processor, which can combine the first and second digital signals to execute signal processing operations on the resulting combined signal. When the "I" and "Q" signals are created with LO signals at quadrature, image rejection beyond the analog domain filtering is created, further improving system image rejection.

The wideband receiver 100 can include a controller 160 that can control operation of the reconfigurable components of the wideband receiver 100. The controller 160 can be similar to controllers and digital signal processors described in U.S. Pat. Nos. 9,240,815, 9,059,662, which is incorporated herein by reference in its entirety, and U.S. Pat. No. 8,963,612, which is incorporated herein by reference in its entirety. The controller 160 can generate various control signals to control operation of the active splitter 108, reconfigurable RF filters 120, 132, and reconfigurable IF filters 144, 148, such as to cause each of these components (and sub-components thereof) to execute a desired change of frequency response responsive to receiving the control signals. For example, the controller 160 can enable wideband operation by controlling the components of the wideband receiver 100 to execute one or more all-passes of the received signals. The controller 160 can enable image rejection by causing cascaded filters to selectively filter at desired frequencies/frequency ranges. The wideband receiver 100 can rapidly perform a broadband frequency search. The controller 160 can generate the control signal(s) to select paths that received signals pass through filter sections of the reconfigurable RF filters 120, 132, and reconfigurable IF filters 144, 148 (e.g., as further discussed with respect to FIGS. 2-3). In some embodiments, the reconfigurable RF filters 120, 132, and specifically the mixers 124, 136 thereof, can operate in a first mode of operation in which the mixers 124, 132 mix the first and second signals with respective LO signals 128, 140. The reconfigurable RF filters 120, 132 can also operate in a second mode of operation, such as a direct sample mode of operation, in which the mixers 124, 132 do not mix the first and second signals with the respective LO signals 128, 140, such as by operating in a variable gain amplifier (VGA) mode. This may be useful if the electronic signal 104 is already at a relatively low frequency (e.g., already at an intermediate frequency), enabling the wideband receiver 100 to be able to respond to a greater range of frequencies (e.g., from below 100 MHz to over 100 GHz) based on the reconfigurability of the mixers 124, 132. The controller 160 can generate control signals that cause the reconfigurable filters 120 to operate in the first mode of operation or the second mode of operation. In some embodiments, the controller 160 can set the reconfigurable IF filters 144, 148 to an all pass mode to enable the first and second signals to be directly sampled by the ADCs 152, 156. In some embodiments, the reconfigurable RF filters 124, 132 can circumvent the reconfigurable IF filters 144, 148, such as by being connected to the ADCs 152, 156 on paths separate from the reconfigurable IF filters 144, 148. It will be appreciated that no image will be created in the signals in the second mode of operation, as no mixing occurs.

Figure 2:
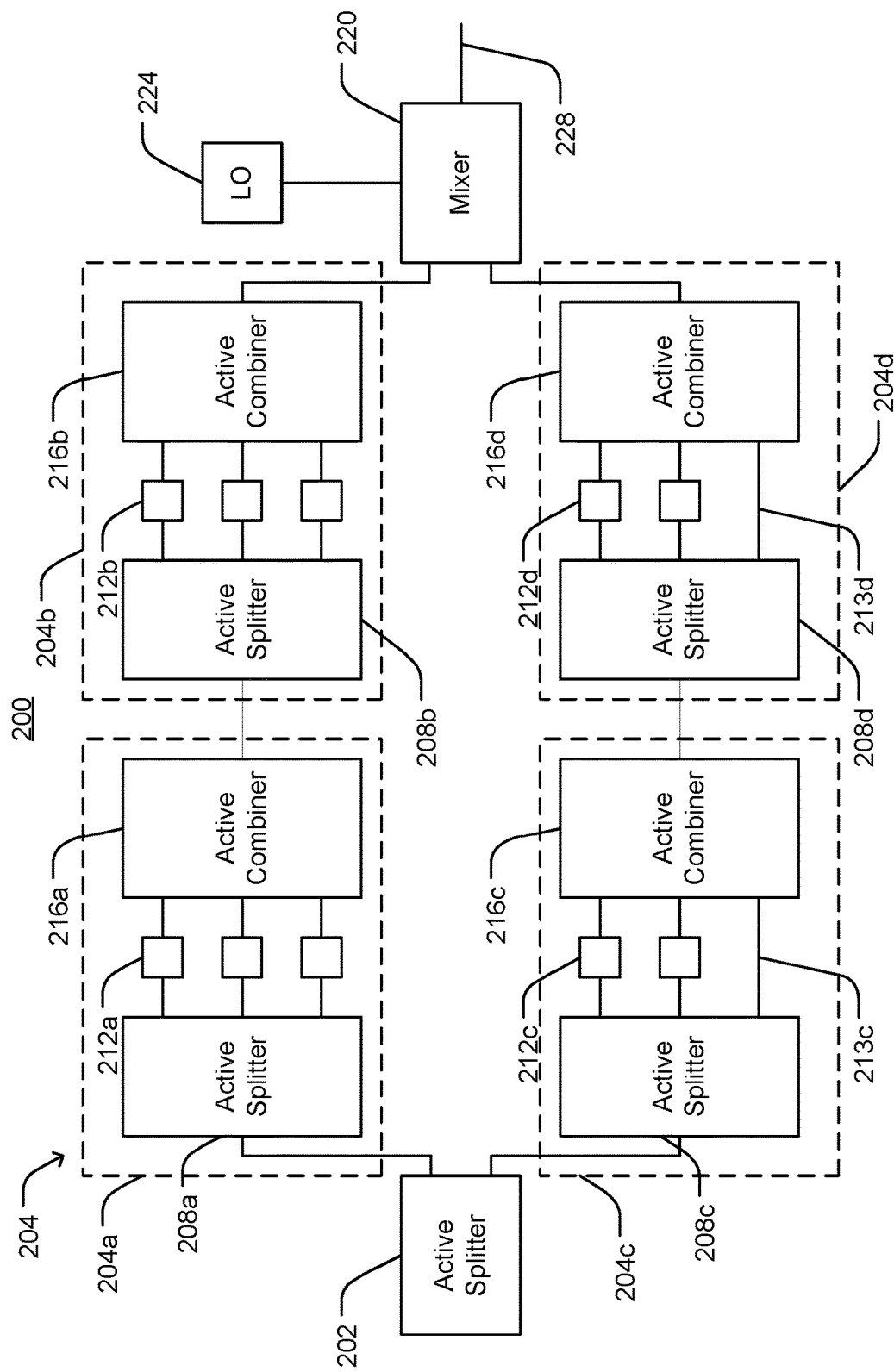
FIG. 2 is a block diagram of an exemplary embodiment of a reconfigurable RF filter circuit that can be implemented in the wideband receiver of FIG. 1.

Referring now to FIG. 2, a reconfigurable RF filter circuit 200 according to an exemplary embodiment of the inventive concepts disclosed herein includes a plurality of reconfigurable filters 204. The reconfigurable RF filter circuit 200 can be used to implement the first and/or second reconfigurable RF filters 120, 132 described with reference to FIG. 1. The reconfigurable RF filter circuits 204 can be arranged for cascaded reconfigurability, to enable shaping and modification of an RF spectrum of a signal received by the reconfigurable RF filter circuit 200.

As shown in FIG. 2, the reconfigurable RF filter circuit 200 can include an active splitter 202, which can be similar to the active splitter 108 described with reference to FIG. 1. For example, the active splitter 202 can receive an input signal (e.g., first signal on first path 112 or second signal on second path 116 of FIG. 1) and split the input signal onto different paths; the outputted signals can be substantially similar to the input signal or can have their gain and/or phase independently modified.

The reconfigurable RF filter circuit 200 can include a first reconfigurable filter 204a, a second reconfigurable filter 204b coupled to an output port of the first reconfigurable filter 204a, a third reconfigurable filter 204c, and a fourth reconfigurable amplifier 204d coupled to an output port of the third reconfigurable amplifier 204c. The active splitter 202 can receive the input signal 202 and split the input signal 202 to the first reconfigurable RF filter 204a and the third reconfigurable RF filter 204c.

The first reconfigurable RF filter 204a includes a first active splitter 208a coupled to a plurality of first filter sections 212a. The first active splitter 208a can be similar to the active splitter 202. While FIG. 2 depicts the first reconfigurable RF filter 204a including three first filter sections 212a, various numbers of first filter sections 212a may be used (e.g., four, five, six filter sections).

Each first filter section 212a can independently filter a corresponding signal received from the active splitter 208a. For example, each first filter section 212a can receive a corresponding control signal and change a frequency response of the signal received from the active splitter 208a responsive to the received control signal. In addition, one or more of the first filter sections 212a can be turned off or isolated (e.g., based on the received control signal).

One or more of the plurality of first filter sections 212a can be a tunable band pass filter. For example, based on the control signal, the tunable band pass filter can output a signal having a peak amplitude at a center frequency and decreasing in amplitude the further the signal is from the center frequency. The tunable band pass filter can include a shunt-connected fixed inductor combined in parallel with a tunable varactor responsive to a control signal. The tunable band pass filter can be implemented using activated passive components as described in U.S. Pat. No. 8,497,730, which is incorporated herein by reference in its entirety.

One or more of the plurality of first filter sections 212a can be a tunable notch filter. For example, based on the control signal, the tunable notch filter can output a signal having a low point (e.g., zero) of amplitude at a center frequency and increasing in amplitude the further the signal is from the center frequency. The tunable notch filter can include a fixed inductor combined in parallel with a tunable varactor. The tunable notch filter can be implemented using activated passive components as described in U.S. Pat. No. 8,497,730, which is incorporated herein by reference in its entirety.

The first reconfigurable RF filter 204a includes a first active combiner 216a that is coupled to the plurality of first filter sections 212a to receive and combine the (filtered) signals from each of the plurality of first filter sections 212a. The first active combiner 216a can incorporate features of the multiple mode circuits described in U.S. Pat. No. 8,660, 514. The first active combiner 216a is operable for modifying the gain and phase for each of the signals received from each first filter section 212a and recombining the signals into a first composite (filtered) signal.

The second reconfigurable RF filter 204b can be similar to the first reconfigurable RF filter 204a, having a second active splitter 208b that can receive the first composite signal from the first reconfigurable RF filter 204a and split the first composite signal onto a plurality of paths to a plurality of second filter sections 212b. The plurality of second filter sections 212b can be similar to the plurality of first filter sections 212a, and can filter the received signals responsive to a control signal to change a frequency response of the received signals, and output the (filtered) signals to a second active combiner 216b. The second active combiner 216b can be operable for modifying the gain and phase for each of the signals received from each second filter section 212b and recombining the signals into a second composite (filtered) signal.

The third reconfigurable RF filter 204c can be similar to the first and second reconfigurable RF filters 204a, 204b, and can receive a signal from the active splitter 202 to be filtered. As shown in FIG. 2, the third reconfigurable RF filter 204c includes an active splitter 208c, a plurality of third filter sections 212c, and a third active combiner 216c. As shown in FIG. 2, the plurality of third filter sections 212c includes a third all pass section 213c. The third all pass section 213c can allow an unfiltered signal to be provide from the third active splitter 208c to a third active combiner 216c. In some embodiments, the reconfigurable RF filter circuit 200 can be driven in a wideband mode, including by causing the third reconfigurable RF filter 204c to provide the signal through the third all pass section 213c.

The fourth reconfigurable RF filter 204d can be similar to the third reconfigurable RF filter 204c, and is shown to include a fourth active splitter 208d, a plurality of fourth filter sections 212d including a fourth all pass section 213d, and an active combiner 216d.

The reconfigurable RF filter circuit 200 includes a mixer 220. The mixer 220 can be similar to the active combiners described herein. The mixer 220 can combine the filtered signals received from the second and fourth reconfigurable RF filters 204b, 204d, and mix the combined, filtered signals with an LO signal 224 (e.g., an in-phase LO signal or a quadrature phase LO signal).

For example, the mixer 220 can mix the combined filtered signal and the LO signal 224 to generate two output signals, a first output signal having a frequency that is a sum of the frequencies of the combined filtered signal and the LO signal 224, and a second output signal having a frequency that is a difference of the frequencies. As such, the mixer 220 can down-convert the relatively high frequency of the combined filtered signal to an IF signal 228 having a relatively low frequency for effective digital signal processing.

In some embodiments, the mixer 220 can operate in a first mode of operation in which the mixer 220 mixes the combined filtered signal and the LO signal 224 to generate the IF signal 228 and provide the IF signal 228 to downstream processing components (e.g., reconfigurable IF filters 144, 148 described with reference to FIG. 1). For example, in the first mode of operation, the mixer 220 can be set to a mixer mode. In a second mode of operation, the mixer 220 can enable a direct sampling operation in which no mixing (e.g., frequency translation) occurs. For example, the mixer 220 can operate in a variable gain amplifier mode, and can output the combined filtered signal without mixing with the LO signal 224.

Figure 3:
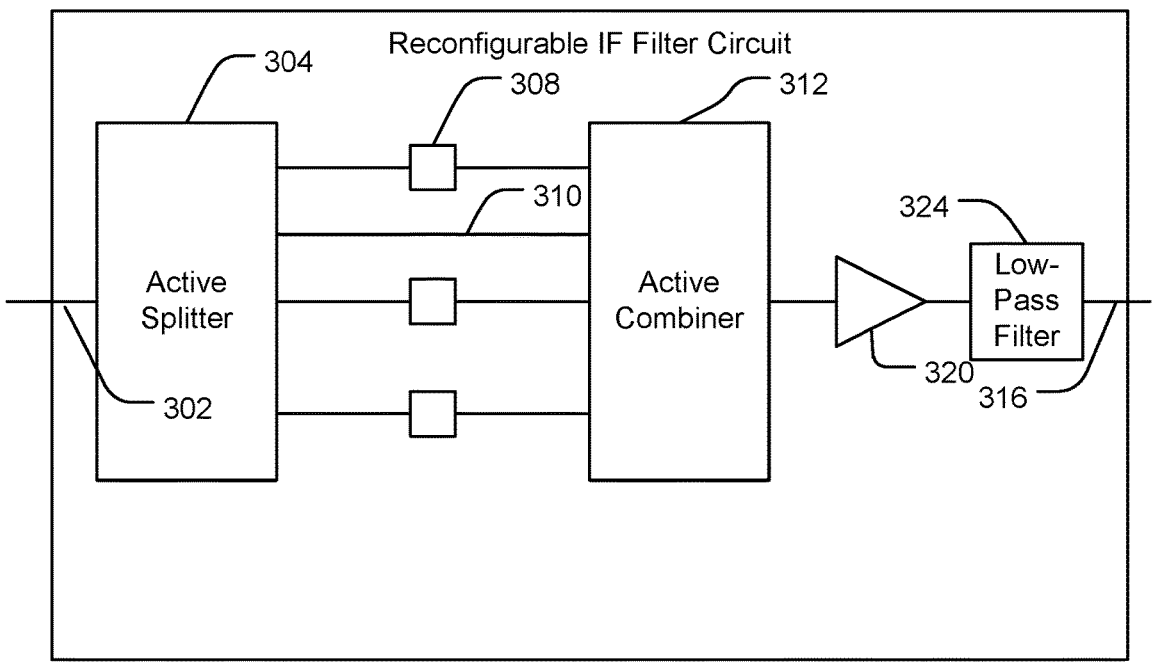
FIG. 3 is a block diagram of an exemplary embodiment of a reconfigurable intermediate IF filter circuit that can be implemented in the wideband receiver of FIG. 1.

Referring now to FIG. 3, a reconfigurable IF filter circuit 300 according to an exemplary embodiment of the inventive concepts disclosed herein includes an active splitter 304 coupled to a plurality of filter sections 308, which can independently filter signals received from the active splitter 304 and provide the filtered signals to an active combiner 312. The reconfigurable IF filter 300 can incorporate features of the reconfigurable RF filter circuit 200 described with reference to FIG. 2. The reconfigurable IF filter circuit 300 can be used to implement the reconfigurable IF filters 144, 148 described with reference to FIG. 1.

As shown in FIG. 3, the plurality of filter sections 308 include an all pass section 310. The reconfigurable IF filter circuit 300 can be driven by a control signal to change a frequency response of a received IF signal 302 (e.g., IF signal outputted by the reconfigurable RF circuit 200 described with reference to FIG. 2) and output a filtered IF signal 316. In some embodiments, the reconfigurable IF filter circuit 300 outputs the filtered IF signal 316 to have a frequency of at least 1 GHz. In some embodiments, the reconfigurable IF filter circuit 300 outputs the filtered IF signal 316 to have a frequency of at most 6 GHz. In some embodiments, the reconfigurable IF filter circuit 300 outputs the filtered IF signal 316 to have a frequency of at most 10 GHz. In some embodiments, the reconfigurable IF filter circuit 300 outputs the filtered IF signal 316 to have a frequency in a range from 1 GHz to 6 GHz.

The reconfigurable IF filter circuit 300 can execute baseband anti-alias filtering based on a received control signal. In some embodiments, the reconfigurable IF filter circuit 300 is programmable to execute a 3 decibel (dB) bandwidth at a plurality of instantaneous bandwidths, such as 100 Megahertz (MHz), 500 MHz, or 5000 MHz and correspondingly change the anti-alias rejection in accordance with the bandwidth and clockrate of the ADC to prevent undesired Nyquist frequencies from contaminating the desired ADCs sampling bandwidth. As compared to existing systems which typically rely on fixed ADC clockrates and fixed anti-alias filters to reject undesired Nyquist zones, the reconfigurable IF filter circuit 300 can enable Nyquist rejection in a reconfigurable and adaptable way in the analog domain in cooperation with reconfigurable RF filters that provide the IF signal to the reconfigurable IF filter circuit 300.

In some embodiments, the reconfigurable IF filter circuit 300 includes an IF buffer 320 and a low-pass filter 324. The low-pass filter 324 can receive an input signal from the active combiner 312 (e.g., via the IF buffer 320) and output the filtered IF signal 316 having had portions of the signal above a threshold frequency removed.

Figure 4:
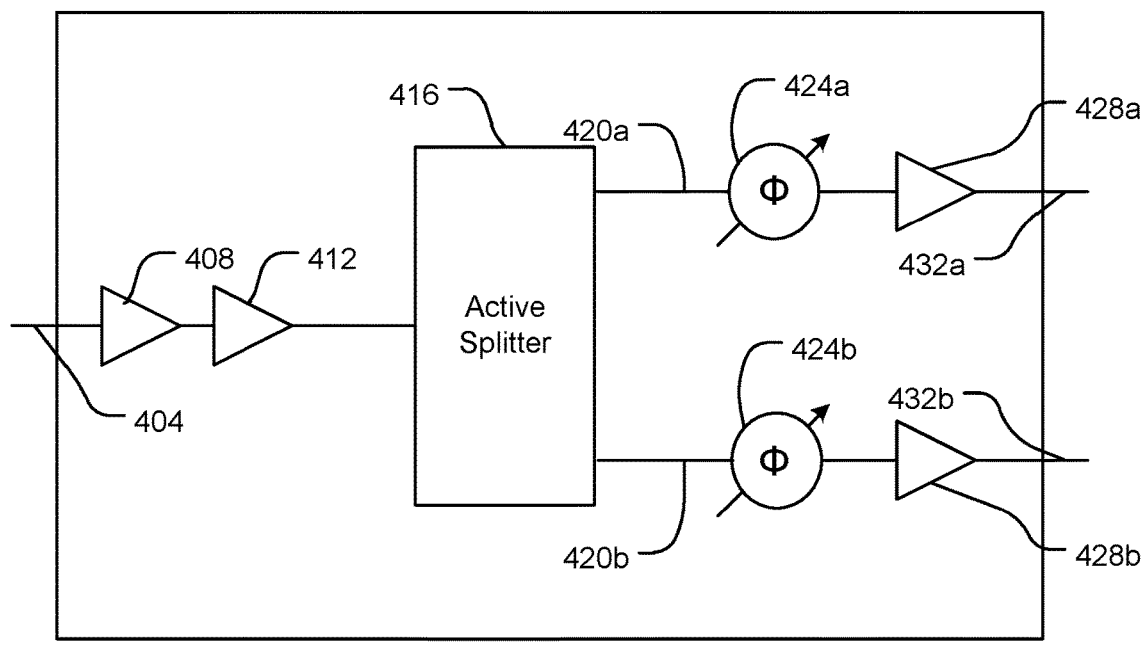
FIG. 4 is a block diagram of an exemplary embodiment of a local oscillator circuit according to the inventive concepts disclosed herein.

Referring now to FIG. 4, an LO circuit 400 according to an exemplary embodiment of the inventive concepts disclosed herein receives an input signal 404 and uses a plurality of channels to output independent phase and amplitude controlled LO signals to the reconfigurable RF sections. The LO circuit 400 can generate the LO signals to be in phase, quadrature, or turned off when in direct sample non-mixing configurations. The LO circuit 400 cangenerate an I-component signal 432a and a Q-component signal 432b based on the input signal 404. The LO circuit 400 can be used to provide the signals 128 and 140 described with respect to FIG. 1. In some embodiments, the LO circuit 400 includes an active balun 408, which can be used to adjust balance of the input signal 404. The LO circuit 400 can include a buffer 412 to buffer the signal received from the active balun 408.

In some embodiments, the LO circuit 400 includes an active splitter 416, which can split an incoming signal onto a first channel path 420a and a second channel path 420b. The LO circuit 400 can include a first modulator 424a that modulates a phase of the received signal to output an I-component of the received signal, which can be passed through a buffer 428a and outputted as the I-component signal 432a. Similarly, the LO circuit 400 can include a second modulator 424b that modulates a phase of the received signal to output a Q-component of the received signal, which can be passed through a buffer 428b and outputted as the Q-component signal 432b.

The LO circuit 400 can selectively generate the signals 432a, 432b based on desired sideband behavior. For example, the LO circuit 400 can generate the signals 432a, 432b to have the same phase, which can enable a wideband receiver as described herein, in mixing mode, to evaluate both sidebands. The LO circuit 400 can generate the signals 432a, 432b to be plus or minus 90 degrees from one another, which can enable each sideband to be independently evaluated. The LO circuit 400 can selectively generate the signals 432a, 432b based on received control signal(s).

Figure 5:
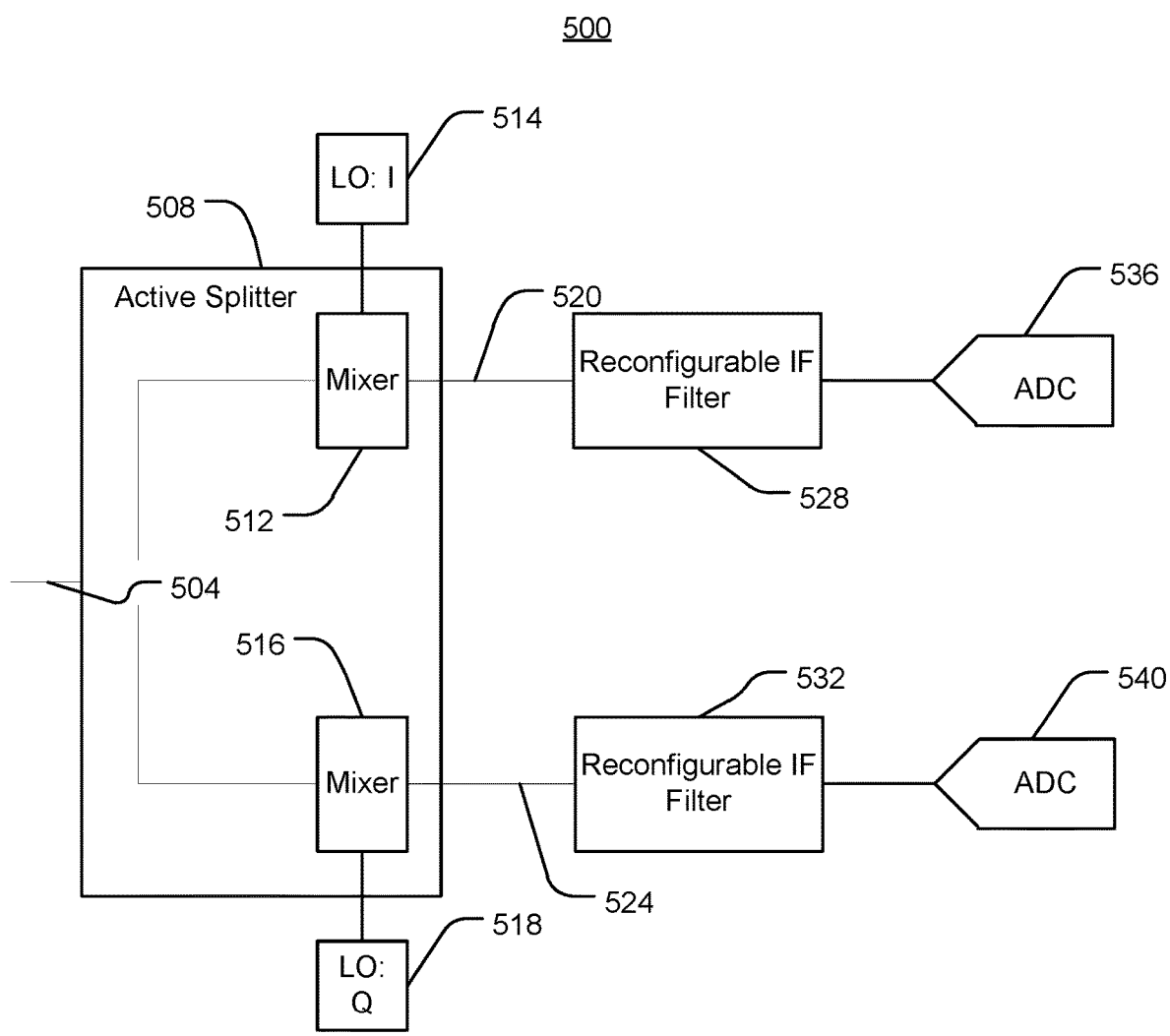
FIG. 5 is a block diagram of an exemplary embodiment of a wideband receiver according to the inventive concepts disclosed herein.

Referring now to FIG. 5, a wideband receiver 500 according to an exemplary embodiment of the inventive concepts disclosed herein includes an active splitter 508, a first reconfigurable IF filter 528, and a second reconfigurable IF filter 532. The wideband receiver 500 can be similar to the wideband receiver 100 described with reference to FIG. 1, except that the wideband receiver 500 may include fewer components, such as by not including the reconfigurable RF filters 120, 132 that are provided between the active splitter 108 and the reconfigurable IF filters 144, 148 of the wideband receiver 100. As such, the wideband receiver 500 may be open to a greater range of transmissions and/or interference (e.g., open to the world) than the wideband receiver 100, due to not performing RF filtering before IF filtering. The wideband receiver 500 may also have less reconfigurability, such as to selectively control how electronic signal 504 is modified prior to mixing. In some embodiments, the wideband receiver 500 can operate with lower consumption as compared to the wideband receiver 100, such as by not including programmable amplifier circuits. The wideband receiver 500 may also have a smaller size relative to the wideband receiver 100. In some embodiments, the wideband receiver 500 may enable greater balance relative to the wideband receiver 100 for larger FQ image suppression.

The active splitter 508 can receive an electronic signal 504, and split the electronic signal 504 into a first signal on a first path 520 and a second signal on a second path 524. The electronic signal 504 can be an RF signal. For example, the electronic signal 504 can be received from an RF antenna. In some embodiments, a frequency of the electronic signal 504 is at least 5 Gigahertz (GHz). In some embodiments, a frequency of the electronic signal 504 is at least 10 GHz. In some embodiments, a frequency of the electronic signal 504 is at most 50 GHz. In some embodiments, a frequency of the electronic signal 504 is at most 100 GHz. In some embodiments, the electronic signal 504 has a frequency range from 10 GHz to 50 GHz.

The active splitter 508 can be similar to various active splitters described herein. The active splitter 508 can execute a first mixer 512 to mix the first signal with an in-phase component of an LO signal 514, and can execute a second mixer 516 to mix the second signal with a quadrature phase component of an LO signal 518. The signals 514, 518 may be received from the LO circuit 400 described with reference to FIG. 4.

The first reconfigurable IF filter 528 can receive a first IF signal on the first path 520, and filter the first IF signal. The first reconfigurable IF filter 528 can be implemented using the reconfigurable IF filter circuit 300 described with reference to FIG. 3. The second reconfigurable IF filter 532 can be similar to the first reconfigurable IF filter 528, and can receive a second IF signal on the second path 524 and filter the second IF signal.

In some embodiments, the wideband receiver 500 includes a first ADC 540 that can convert the first (filtered) IF signal to a first digital signal. The wideband receiver 500 can include a second ADC 544 that can convert the second (filtered) IF signal to a second digital signal. The first and second digital signals can be provided to a digital signal processor for further processing.

In some embodiments, by not performing RF filtering using programmable amplifier circuits in a manner similar to wideband receiver 100, the wideband receiver 500 may be susceptible to contamination by a third harmonic of the LO signals, as RF energy around the third harmonic may fold over into the desired bandwidth. For example, the third harmonic may contaminate signals around the 10 GHz to 16 GHz range. The wideband receiver 500 can use the LO circuit 400 described with reference to FIG. 4 to filter the LO signals and reduce contamination by signal components around the harmonics of the LO signals.

In some embodiments, the active splitter 508 can operate in a first mode of operation in which the active splitter 108 provides the first signal to the first reconfigurable RF filter 528, and provides the second signal to the second reconfigurable RF filter 532, such as to enable filtering of the first and second signals as described further herein. The active splitter 508 can operate in a second mode of operation in which the active splitter 508 provides the first signal to the first ADC 536 and provides the second signal to the second ADC 540 (e.g., directly provides the first and second signals to the respective first and second ADCs 536, 540 without passing through the reconfigurable IF filters 528 and 532 and/or by setting the reconfigurable IF filters 528 and 532 to all-pass modes of operation), which may be useful if the electronic signal 104 is received at relatively low frequencies at which digital signal processing can be performed without down-converting (e.g., by setting the mixers 512, 516 to a mode in which the mixers 512, 516 do not mix the first and second signals with the respective LO signals). A controller (e.g., controller 160 described with reference to FIG. 1) can use the control signal(s) provided to the active splitter 508 to cause the active splitter 508 to operate in the first mode of operation or the second mode of operation.

Figure 6:
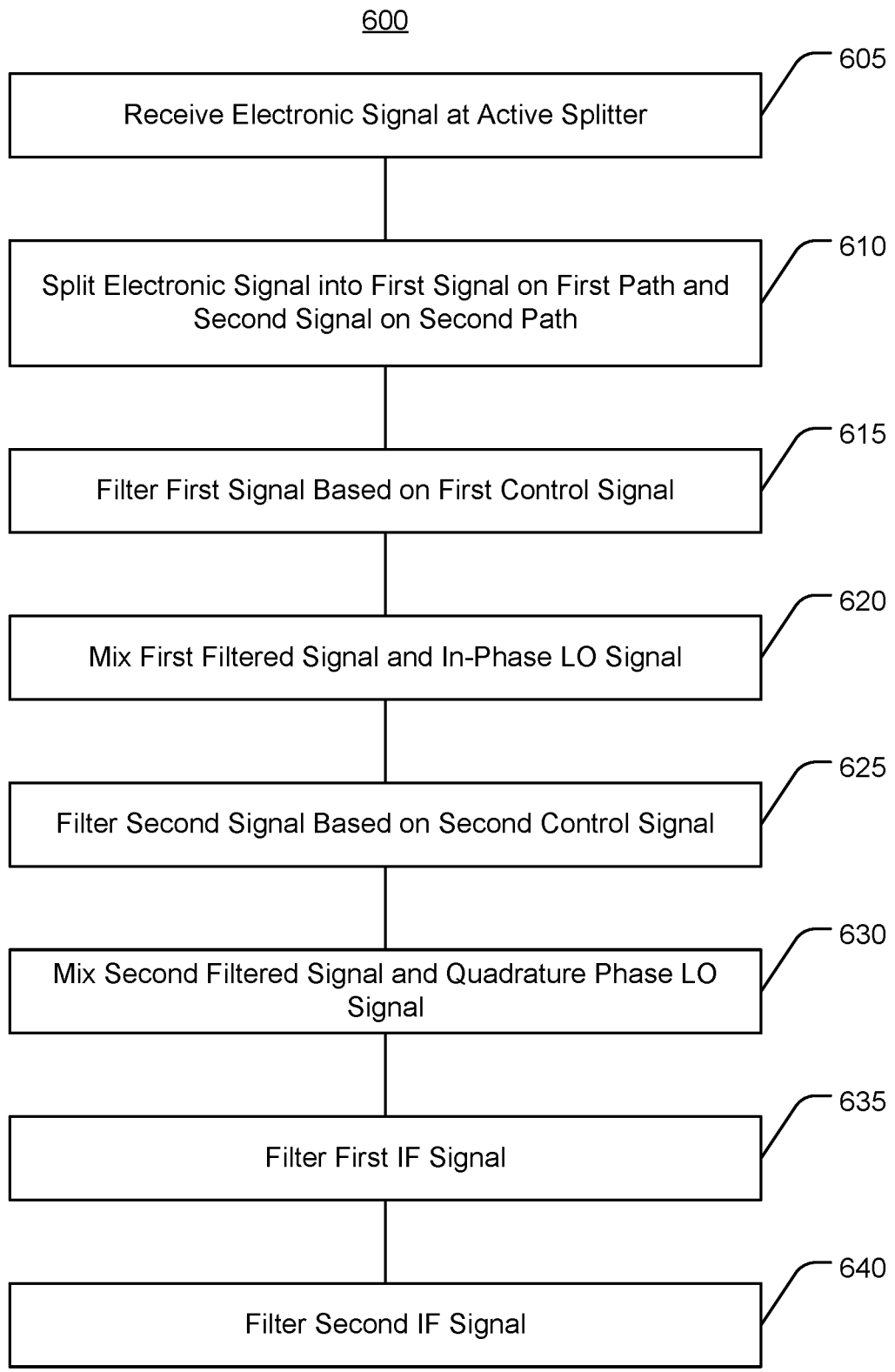
FIG. 6 is a flow diagram of an exemplary embodiment of a method of operating a wideband receiver according to the inventive concepts disclosed herein.

Referring now to FIG. 6, a method 600 for operating a wideband image-rejecting receiver is shown according to an exemplary embodiment of the inventive concepts disclosed herein. The method 600 can be performed by various wideband receivers and associated components described herein.

At 605, an electronic signal is received by an active splitter. The electronic signal can be an RF signal. In some embodiments, a frequency of the electronic signal is at least 5 Gigahertz (GHz). In some embodiments, a frequency of the electronic signal is 50 GHz. In some embodiments, a frequency of the electronic signal is 100 GHz. In some embodiments, the electronic signal has a frequency range from 10 GHz to 50 GHz. In some embodiments, the electronic signal has a frequency range from below 100 MHz to over 100 GHz.

At 610, the active splitter splits the electronic signal into a first signal on a first path and a second signal on a second path. The active splitter can independently modify at least one of a phase or an amplitude of each of the first signal and the second signal. The active splitter can independently control amplitude and linearity of each of the first signal and the second signal.

At 615, a first reconfigurable RF filter circuit filters the first signal responsive to a first control signal to generate a first filtered signal. The first reconfigurable RF filter can include a first active splitter that splits the first signal to a first filter path including a first reconfigurable RF filter and a second reconfigurable RF filter and a second filter path including a third reconfigurable RF filter and a fourth reconfigurable RF filter. The first reconfigurable RF filter can include a second active splitter coupled to a plurality of first filter sections coupled to an active combiner. Each first filter section can include at least one of a tunable band pass filter or a tunable notch filter. The second reconfigurable RF filter can include a third active splitter coupled to the first active combiner, the third active splitter coupled to a plurality of second filter sections coupled to a second active combiner. Each second filter section can include at least one of a tunable band pass filter or a tunable notch filter. The third reconfigurable RF filter can include a fourth active splitter coupled to a plurality of third filter sections coupled to a third active combiner. At least one of the plurality of third filter sections can include an all pass section. The fourth reconfigurable RF filter can include a fifth active splitter coupled to the third active combiner, the fifth active splitter coupled to a plurality of fourth filter sections coupled to a fourth active combiner. At least one of the plurality of fourth filter sections can include an all pass section. The first reconfigurable RF filter circuit can include a fifth active combiner that combines output of the second active combiner and the fourth active combiner to generate the first filtered signal. The first reconfigurable RF filter circuit can operate in a wideband mode by providing signals through at least one all pass filter section. The first reconfigurable RF filter circuit can execute image rejection by being controlled to filter out portions of the signals at frequencies at which images are expected.

At 620, a first mixer of the first reconfigurable RF filter circuit mixes the first filtered signal and an in-phase component of an LO signal to output a first IF signal. For example, the first mixer can heterodyne the first filtered signal and the in-phase component of the LO signal to generate the first IF signal. The first IF signal can be at a relatively low frequency as compared to the electronic signal, such as a frequency sufficiently low to enable digital signal processing to be executed on the first IF signal with desired performance and/or quality. The first IF signal can have a frequency of a range from 1 GHz to 6 GHz, such as to enable digital signal processing on the first IF signal.

At 625, a second reconfigurable RF filter circuit filters the second signal responsive to a second control signal to generate a second filtered signal. The second reconfigurable RF filter circuit can be similar to the first RF filter circuit. The second reconfigurable RF filter circuit can operate in a wideband mode by providing signals through at least one all pass filter section. The second reconfigurable RF filter circuit can execute image rejection by being controlled to filter out portions of the signals at frequencies at which images are expected.

At 630, a second mixer of the second reconfigurable RF filter circuit mixes the second filtered signal and a quadrature component of the LO signal to output a second IF signal. For example, the second mixer can heterodyne the second filtered signal and the quadrature component of the LO signal to output the second IF signal.

At 635, a first reconfigurable IF filter circuit filters the first IF signal responsive to a third control signal to generate a first filtered IF signal. The first reconfigurable IF filter circuit can include an active splitter that receives the first IF signal and splits the first IF signal. The first reconfigurable IF filter circuit can include a plurality of filter sections that receive respective split first IF signals, at least one of the plurality of filter sections including at least one of a tunable band pass filter or a tunable notch filter, at least one of the plurality of filter sections including an all pass section. The first reconfigurable IF filter circuit can include an active combiner that combines signals received from the plurality of filter sections.

At 640, a second reconfigurable IF filter circuit filters the second IF signal responsive to a fourth control signal to generate a second filtered IF signal. The second reconfigurable IF filter circuit can be similar to the first reconfigurable IF filter circuit. The first and second IF signals can have a frequency of a range from 1 GHz to 6 GHz, such as to enable digital signal processing on the first and second IF signal. In some embodiments, the first and second IF signals are outputted to respective ADCs, which can sample the respective first and second IF signals to generate first and second digital signals for further processing.

In some embodiments, in a first mode of operation, the first reconfigurable RF filter and the second reconfigurable RF filter mix the first and second signals with the respective LO signals to generate the first and second IF signals. In some embodiments, in a second mode of operation, the first and second reconfigurable RF filters can enable direct sampling by providing the first and second signals to the first and second ADCs. For example, in the second mode of operation, the mixers of the reconfigurable RF filters can be set to a non-mixing mode to not mix the first and second signals with the respective LO signals; the reconfigurable RF filters can circumvent the reconfigurable IF filters and/or the reconfigurable IF filters can be set to an all-pass mode, enabling direct sampling by the ADCs.

As will be appreciated from the above, systems and methods for wideband image-rejecting receivers in accordance with the inventive concepts disclosed herein can have improved performance, including wideband operation from less than 100 MHz to over 100 GHz while providing image rejection and instantaneous bandwidth of 100 MHz, 500 MHz, and/or 5000 MHz. Wideband receivers in accordance with the inventive concepts disclosed herein can effectively transition between direct sampling modes of operation (e.g., when the electronic signal is received at intermediate frequencies which may already be low enough to enable digital signal processing) and filtering modes of operation.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A wideband receiver, comprising:
an active splitter that receives an electronic signal and splits the electronic signal into a first signal on a first path and a second signal on a second path;
a first reconfigurable radio frequency (RF) filter circuit that receives the first signal, filters the first signal responsive to a first control signal to generate a first filtered signal, receives an in-phase component of a local oscillator (LO) signal, and mixes the first filtered signal and the in-phase component of the LO signal to output a first intermediate frequency (IF) signal;
a second reconfigurable RF filter circuit that receives the second signal, filters the second signal responsive to a second control signal to generate a second filtered signal, receives a quadrature phase component of the LO signal, and mixes the second filtered signal and the quadrature phase component of the LO signal to output a second IF signal;
a first reconfigurable IF filter circuit that receives the first IF signal and filters the first IF signal responsive to a third control signal to generate a first filtered IF signal; and a second reconfigurable IF filter circuit that receives the second IF signal and filters the second IF signal responsive to a fourth control signal to generate a second filtered IF signal.

2. The wideband receiver of claim 1, wherein the first reconfigurable RF filter circuit includes:
a first active splitter that splits the first signal to a first filter path including a first reconfigurable RF filter and a second reconfigurable RF filter and a second filter path including a third reconfigurable RF filter and a fourth reconfigurable RF filter, the first reconfigurable RF filter including a second active splitter coupled to a plurality of first filter sections coupled to a first active combiner, each first filter section including at least one of a tunable band pass filter or a tunable notch filter, the second reconfigurable RF filter including a third active splitter coupled to the first active combiner, the third active splitter coupled to a plurality of second filter sections coupled to a second active combiner, each second filter section including at least one of a tunable band pass filter or a tunable notch filter, the third reconfigurable RF filter including a fourth active splitter coupled to a plurality of third filter sections coupled to a third active combiner, at least one of the plurality of third filter sections including an all pass section, the fourth reconfigurable RF filter including a fifth active splitter coupled to the third active combiner, the fifth active splitter coupled to a plurality of fourth filter sections coupled to a fourth active combiner, at least one of the plurality of fourth filter sections including an all pass section; and
a fifth active combiner that combines output of the second active combiner and the fourth active combiner to generate the first filtered signal.

3. The wideband receiver of claim 1, wherein the first reconfigurable IF filter circuit includes:
an active splitter that receives the first IF signal and splits the first IF signal;
a plurality of filter sections that receive respective split first IF signals, at least one of the plurality of filter sections including at least one of a tunable band pass filter or a tunable notch filter, at least one of the plurality of filter sections including an all pass section; and
an active combiner that combines signals received from the plurality of filter sections.

4. The wideband receiver of claim 1, wherein a frequency of the electronic signal is greater than or equal to one gigahertz and less than or equal to one hundred gigahertz.

5. The wideband receiver of claim 1, wherein at least one of the first IF signal or the second IF signal has an instantaneous bandwidth of one hundred megahertz, five hundred megahertz, or five thousand megahertz.

6. The wideband receiver of claim 1, wherein:
in a first mode of operation, the first reconfigurable RF filter circuit mixes the first filtered signal and the in-phase component of the LO signal to output the first IF signal, and the second reconfigurable RF filter circuit mixes the first filtered signal and the quadrature component of the LO signal to output the second IF signal; and
in a second mode of operation, the first reconfigurable RF filter circuit outputs at least one of the first signal or the first filtered signal to the first reconfigurable IF filter circuit, the second reconfigurable RF filter circuit outputs at least one of the second signal or the second filtered signal to the second reconfigurable RF filter circuit.

7. The wideband receiver of claim 1, comprising a local oscillator circuit configured to generate the in-phase component of the LO signal and the quadrature component of the local oscillator signal, the local oscillator circuit configured to set a phase difference between the in-phase component and the quadrature component of the LO signal to be approximately zero, plus ninety degrees, or minus ninety degrees responsive to the third control signal.

8. The wideband receiver of claim 2, wherein at least one of the first active splitter or the fifth active combiner modifies at least one of a phase or an amplitude of a corresponding received signal.

9. A wideband receiver, comprising:
an active splitter configured to:
receive an electronic signal;
split the electronic signal into a first signal on a first path and a second signal on a second path; and
in a first mode of operation, receive an in-phase component of a local oscillator (LO) signal, mix the first signal and the in-phase component of the LO signal to output a first IF signal, receive a quadrature component of the LO signal, and mix the second signal and the quadrature component of the LO signal to output a second IF signal;
a first reconfigurable intermediate frequency (IF) filter circuit that receives the first signal and filters the first signal responsive to a first control signal to generate a first filtered signal; and
a second reconfigurable IF filter circuit that receives the second signal and filters the second signal responsive to a second control signal to generate a second filtered signal.

10. The wideband receiver of claim 9, wherein the first reconfigurable IF filter circuit and the second reconfigurable IF filter circuit each includes:
an active splitter that receives the first IF signal and splits the first IF signal;
a plurality of filter sections that receive respective split first IF signals, at least one of the plurality of filter sections including at least one of a tunable band pass filter or a tunable notch filter, at least one of the plurality of filter sections including an all pass section; and
an active combiner that combines signals received from the plurality of filter sections.

11. The wideband receiver of claim 9, wherein a frequency of the electronic signal is greater than or equal to five gigahertz and less than or equal to one hundred gigahertz.

12. The wideband receiver of claim 9, further comprising a local oscillator circuit configured to generate the in-phase component of the local oscillator signal and the quadrature component of the local oscillator signal.

13. The wideband receiver of claim 9, wherein in a second mode of operation, the active splitter passes the first signal to a first analog-to-digital converter (ADC) and passes the second signal to a second ADC, and the active splitter operates in the first mode of operation or the second mode of operation responsive to a third control signal.

14. The wideband receiver of claim 12, wherein the local oscillator circuit filters a third harmonic of the local oscillator signal.

15. The wideband receiver of claim 12, wherein the local oscillator circuit is configured to set a phase difference between the local oscillator signals to be approximately zero, plus ninety degrees, or minus ninety degrees responsive to a third control signal.

16. A method, comprising:
   receiving, by an active splitter, an electronic signal;
   splitting, by active splitter, the electronic signal into a first signal on a first path and a second signal on a second path;
   filtering, by a first reconfigurable radio frequency (RF) filter circuit, the first signal responsive to a first control signal to generate a first filtered signal;
   mixing, by a mixer of the first reconfigurable RF filter circuit, the first filtered signal and an in-phase component of a local oscillator (LO) signal to output a first intermediate frequency (IF) signal;
   filtering, by a second reconfigurable RF filter circuit, the second signal responsive to a second control signal to generate a second filtered signal;
   mixing, by a mixer of the second reconfigurable RF filter circuit, the second filtered signal and a quadrature phase component of the LO signal to output a second IF signal;
   filtering, by a first reconfigurable IF filter circuit, the first IF signal responsive to a third control signal to generate a first filtered IF signal; and
   filtering, by a second reconfigurable IF filter circuit, the second IF signal responsive to a fourth control signal to generate a second filtered IF signal.

17. The method of claim 16, wherein the first reconfigurable RF filter circuit includes:
   a first active splitter of the first reconfigurable RF circuit that splits the first signal to a first filter path including a first reconfigurable RF filter and a second reconfigurable RF filter and a second filter path including a third reconfigurable RF filter and a fourth reconfigurable RF filter, the first reconfigurable RF filter including a second active splitter coupled to a plurality of first filter sections coupled to an active combiner, each first filter section including at least one of a tunable band pass filter or a tunable notch filter, the second reconfigurable RF filter including a third active splitter coupled to a first active combiner, the third active splitter coupled to a plurality of second filter sections coupled to a second active combiner, each second filter section including at least one of a tunable band pass filter or a tunable notch filter, the third reconfigurable RF filter including a fourth active splitter coupled to a plurality of third filter sections coupled to a third active combiner, at least one of the plurality of third filter sections including an all pass section, the fourth reconfigurable RF filter including a fifth active splitter coupled to the third active combiner, the fifth active splitter coupled to a plurality of fourth filter sections coupled to a fourth active combiner, at least one of the plurality of fourth filter sections including an all pass section; and
   a fifth active combiner that combines output of the second active combiner and the fourth active combiner to generate the first filtered signal.

18. The method of claim 17, comprising modifying, by at least one of the first active splitter or the fifth active combiner, at least one of a phase or an amplitude of a corresponding received signal.

19. The method of claim 16, comprising:
   splitting, by an active splitter of the first reconfigurable IF circuit, the first IF signal;
   filtering, by one or more of a plurality of filter sections of the first reconfigurable IF circuit that receive respective split first IF signals, the respective split first IF signals, at least one of the plurality of filter sections including at least one of a tunable band pass filter or a tunable notch filter, at least one of the plurality of filter sections including an all pass section; and
   combining, by an active combiner, signals received from the plurality of filter sections.

20. The method of claim 16, comprising:
   in a first mode of operation, mixing, by the first reconfigurable RF filter circuit, the first filtered signal and the in-phase component of the LO signal to output the first IF signal, and mixing, by the second reconfigurable RF filter circuit, the first filtered signal and the quadrature component of the LO signal to output the second IF signal; and
   in a second mode of operation, outputting, by the first reconfigurable RF filter circuit, at least one of the first signal or the first filtered signal to the first reconfigurable IF filter circuit, and outputting, by the second reconfigurable RF filter circuit, at least one of the second signal or the second filtered signal to the second reconfigurable RF filter circuit.

* * * * *